United States Patent [19]

Batstra

[11] Patent Number: 4,547,331

[45] Date of Patent: Oct. 15, 1985

[54] METHOD FOR MANUFACTURING LIGHT-WEIGHT SHAPED CONCRETE ARTICLES, SUCH AS BLOCK-SHAPED BUILDING ELEMENTS

[75] Inventor: Ype Batstra, Noordwijk aan Zee, Netherlands

[73] Assignee: International Osobouw Sales Office N.V., Curacao, Netherlands Antilles

[21] Appl. No.: 595,056

[22] Filed: Mar. 30, 1984

Related U.S. Application Data

[63] Continuation-in-part of Ser. No. 425,301, Sep. 28, 1982, abandoned.

[30] Foreign Application Priority Data

May 19, 1982 [NL] Netherlands ............................ 8202080

[51] Int. Cl.[4] ........................... B28B 3/00; B28C 5/20
[52] U.S. Cl. .................................. 264/333; 264/109; 264/DIG. 7
[58] Field of Search ................. 264/DIG. 7, 109, 123, 264/333

[56] References Cited

U.S. PATENT DOCUMENTS

| | | | |
|---|---|---|---|
| 3,251,916 | 5/1966 | Newnham et al. | 264/DIG. 7 |
| 3,354,099 | 11/1967 | Stegeman | 264/DIG. 7 |
| 3,725,315 | 4/1973 | Bauer | 264/DIG. 7 |
| 3,764,357 | 10/1973 | Bowles et al. | 264/DIG. 7 |
| 3,836,617 | 9/1974 | Lankheet | 264/DIG. 7 |

Primary Examiner—Philip Anderson
Attorney, Agent, or Firm—Martin Smolowitz

[57] ABSTRACT

Loose, substantially sphere-shaped particles of a foamed plastic material, e.g., polystyrene, are blended with a binder consisting of a solution of 75–85% by weight of coal-tar pitch having a ring and ball softening point of 50°–65° C. in 15–25% by weight of phenol-free coal-tar oil having a distillation range of 150°–275° C. and 20–35% by volume of an epoxy resin. The resulting sticky mass is then blended with dry cement to produce a mass of loose particles of foamed plastic material coated with a film of dry cement. A second portion of dry cement and sufficient water to harden the cement are added and the moist mixture is pressed into the desired shape.

6 Claims, 10 Drawing Figures

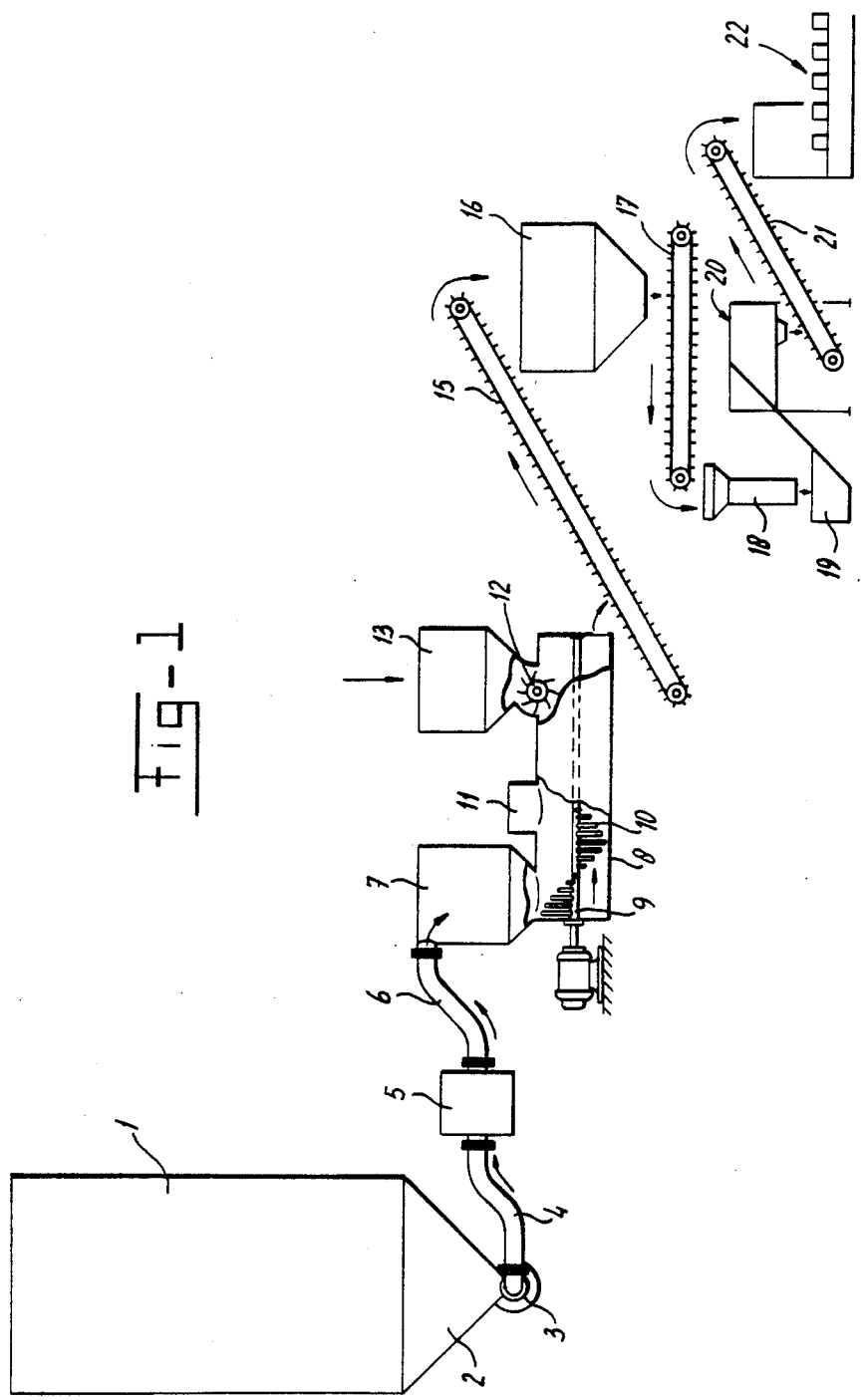

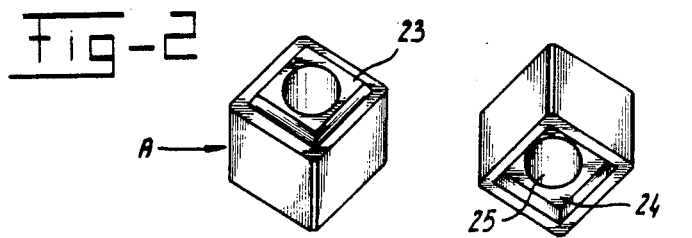
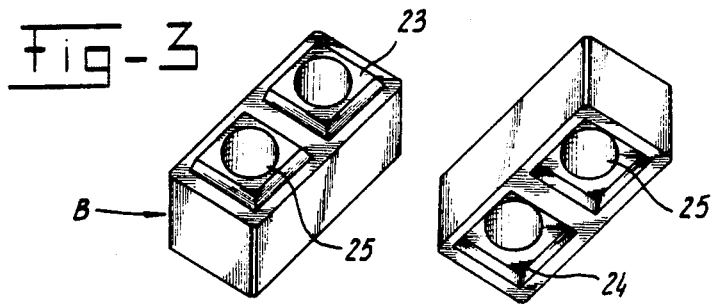
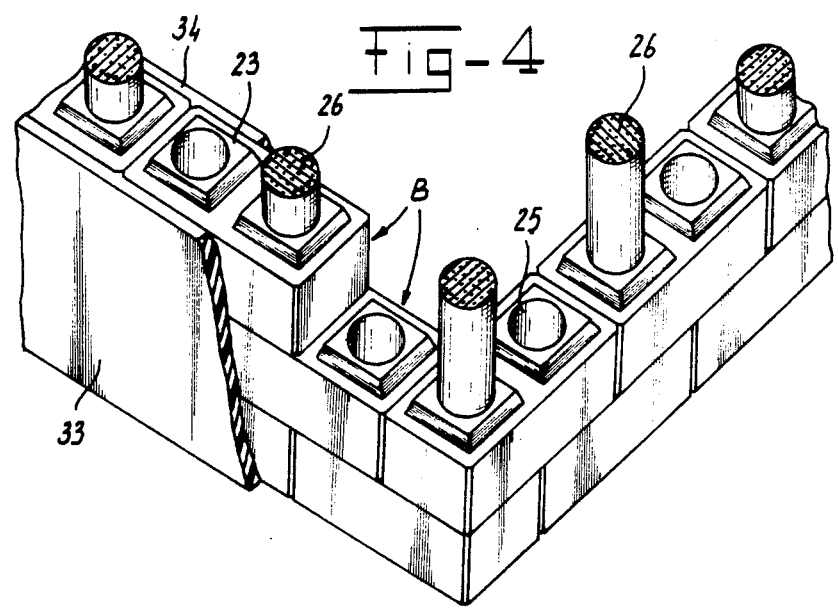

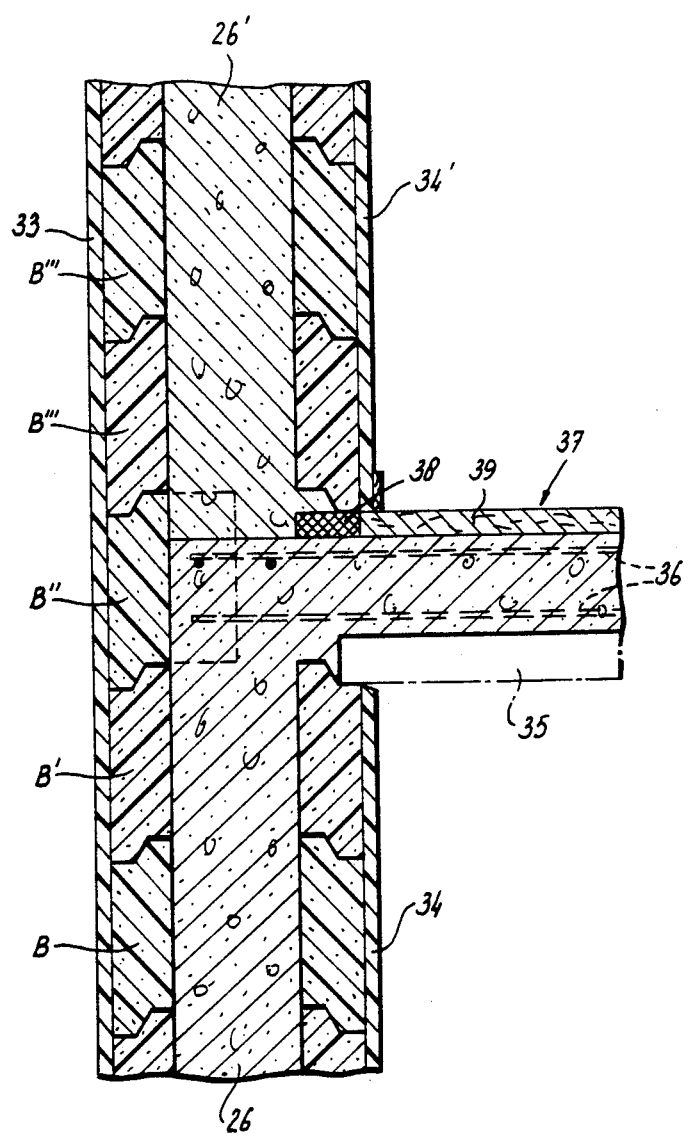

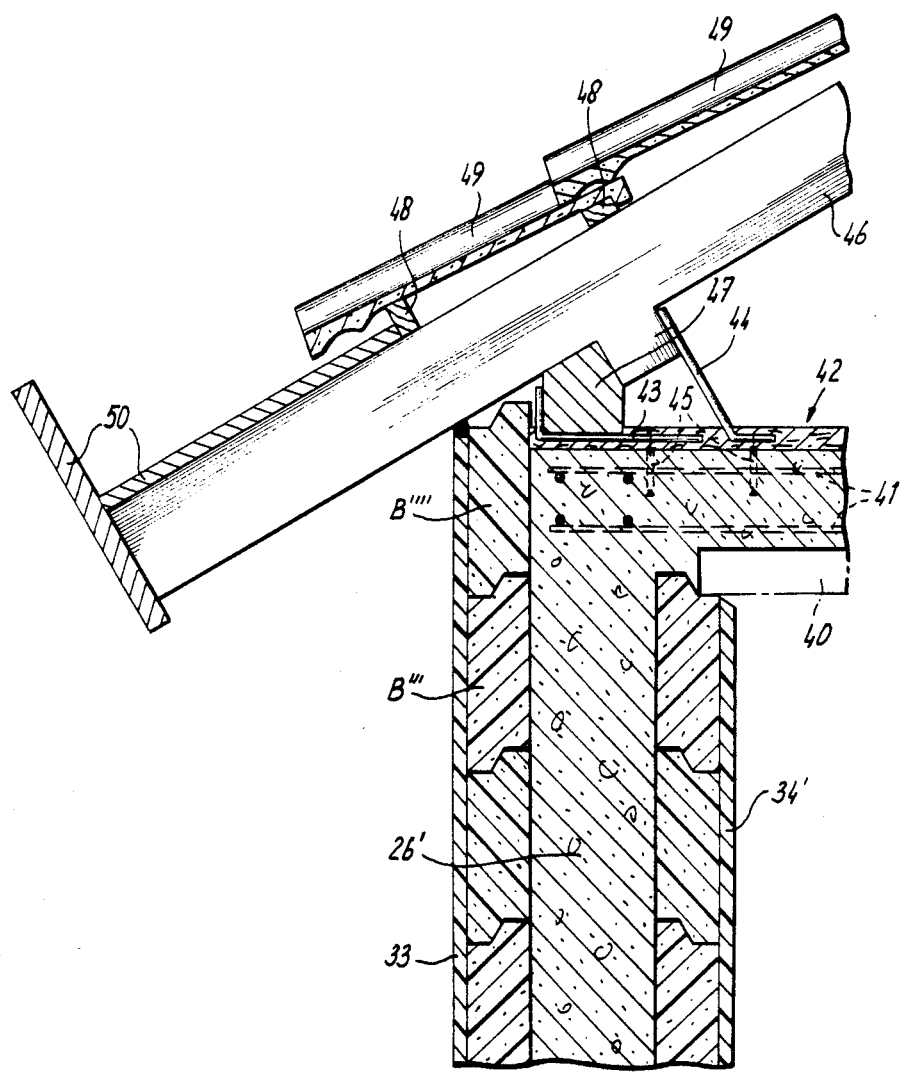

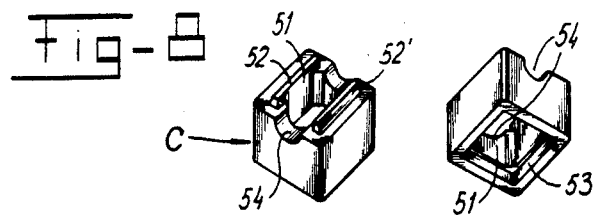
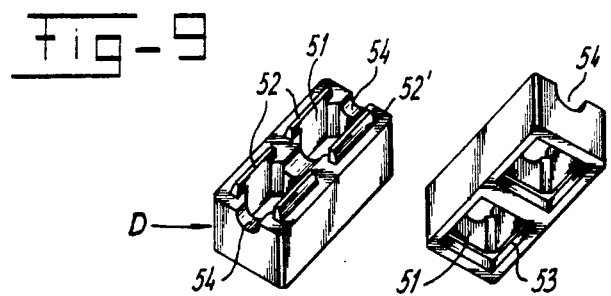
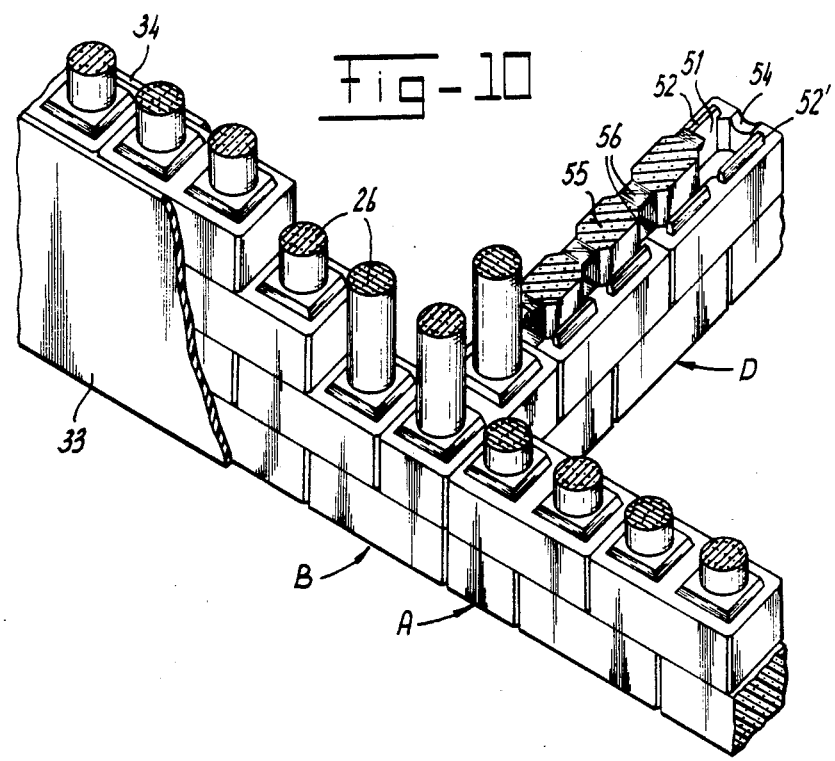

METHOD FOR MANUFACTURING LIGHT-WEIGHT SHAPED CONCRETE ARTICLES, SUCH AS BLOCK-SHAPED BUILDING ELEMENTS

CROSS REFERENCE TO RELATED APPLICATIONS

This is a continuation-in-part of application Ser. No. 425,301, filed 9/28/82 and now abandoned.

BACKGROUND OF THE INVENTION

The invention relates to a method for manufacturing lightweight shaped concrete articles, such as block-shaped concrete building elements, flat or channel shaped insulation plates for roof sheeting purposes etc., in which substantially sphere-shaped particles of foamed plastic material are blended with a binder by means of which the adherence of the foamed plastic material to cement is promoted, at the end of which blending operation a portion of the cement in dry condition is added and co-blended with said blend until the mass again consists mainly of loose spheres, whereupon the remaining portion of the cement is added and the entire mixture is subjected again to a second mixing operation, while metering a quantity of water, and the mixture thus finally obtained is pressed into the desired shape. A method of this type is known from Dutch patent application No. 71,13658.

In the known method the binder comprises a bituminous product, i.e., a petroleum-based product. This product has the disadvantage that is smells heavily so that the articles finally obtained have to be left exposed to the open air for a long time before these articles, in particular block-shaped building elements, can be used for building, e.g. houses.

Moreover, the bituminous product has to be heated in the temperate and frigid climatic zones, before this product can be mixed with the spheres of foamed plastic material. This requires an additional operation and additional energy, while in hot climatic zones, the bituminous product does not harden and thus cannot be used.

In European patent application No. 80901389, it is proposed to use, instead of a solely bituminous product, a mixture of a bituminous product and waterglass as the binder. However, the added quantity of waterglass presents the serious disadvantage that it becomes very rapidly so viscous that the mixing apparatus will jam and that, when the apparatus is stopped after a running period, it forms such hard deposits that the apparatus cannot be started any more.

U.S. Pat. No. 3,899,455 discloses a method for preparing lightweight concrete in which closed cell foamed polystyrene particles are coated, prior to their incorporation into the concrete, with a phenol-containing coal tar. Phenol is an undesirable substance since it injuriously affects the health of the persons involved in the preparation of the concrete.

Further, in said U.S. patent it is mentioned that it is known in the art to treat the foamed particles with an aqueous dispersion of an epoxy resin prior to their incorporation into the hydraulic binding agent.

However, using an aqueous dispersion of an epoxy resin in the method according to the invention would be very detrimental to the adherence of the first portion of the cement added at the end of the first blending operation to the foamed spheres as this cement would then be set by the water contained in said dispersion. Moreover, an epoxy resin cured from an aqueous dispersion is very brittle and exhibits a poor cohesion.

SUMMARY OF THE INVENTION

The object of the invention is to provide an improved binder which does not present the above-mentioned disadvantages.

This object is attained in that the binder according to the invention consists of a mixture of a phenol-free solution of coat-tar pitch in coal-tar oil and an epoxy resin, which mixture preferably contains at least 20% by volume of said epoxy resin, and said solution contains 75–85% by weight of coal-tar pitch and 15–25% by weight of coal-tar oil, wherein the coal-tar pitch has a ring and ball softening point of 50°–65° C. and the coal-tar oil has a distillation range of 150°–275° C.

The plastic particles are completely coated with the binder which promotes excellent adherence of the foamed plastic material to the cement while it is completely odorless and does not need to be heated. Moreover, the plastic particles are rendered harder so that the articles finally obtained has an improved compressive strength.

BRIEF DESCRIPTION OF THE DRAWINGS

The invention will now be described in more detail with reference to the schematic drawing in which:

FIG. 1 shows an apparatus preferably used for carrying out the method according to the invention, FIGS. 2 and 3 show building blocks obtained by the method according to the invention, FIG. 4 shows the way in which the walls of a building are erected from the blocks shown in FIGS. 2 and 3, FIGS. 5, 6 and 7 show details of said walls, FIGS. 8 and 9 show building blocks for forming inner walls, and FIG. 10 shows the way in which an inner wall of a building is erected from the blocks shown in FIGS. 8 and 9 in connection with an outer wall.

DETAILED DESCRIPTION

Figure 5:
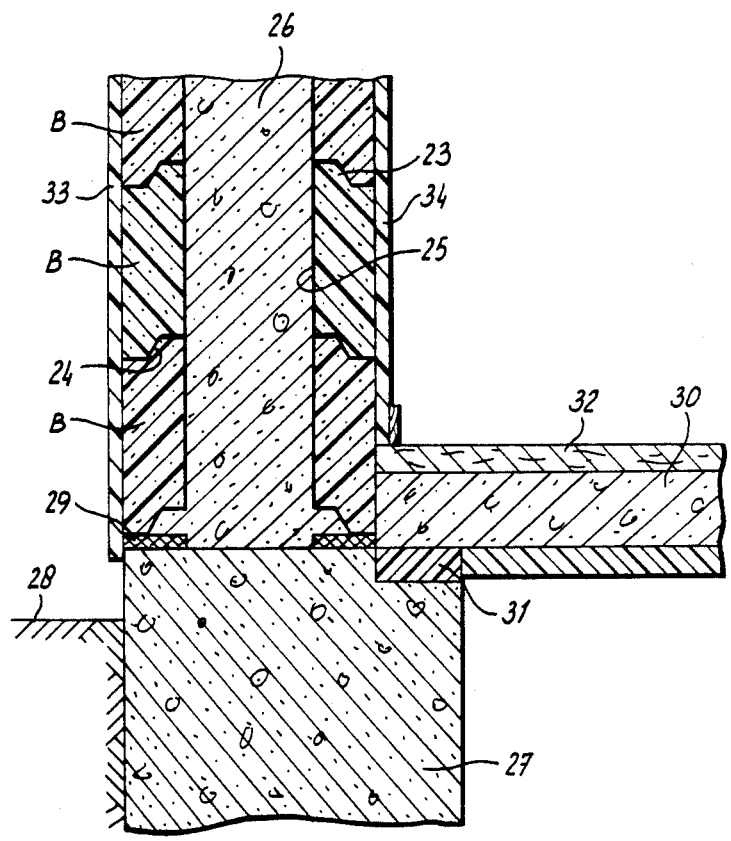

The binder according to the invention includes four components, namely coal-tar oil, coal-tar pitch, an epoxy resin and a curing agent for the epoxy resin.

The coal-tar oil component comprises the lighter fractions obtained from coal-tar distillation. For use in the present invention, the coal-tar oil should be free from phenols. These may be removed from the oil by extraction with aqueous NaOH.

The coal-tar pitch component is the dark brown to black amorphous residue left after coal tar is redistilled. It is free of phenols and is composed almost entirely of polynuclear aromatic compounds.

The epoxy resins which are preferred for use in the binder according to the invention are reaction products of bisphenol A (4,4'-isopropylidenediphenol) and epichlorohydrin modified with glycidyl ethers. The most preferred is modified with $C_{12}$–$C_{14}$ aliphatic glycidyl ether and is sold under the trade name Dow Epoxy Resin 324.

The expoy resin is employed in the amount of 20–35% by volume of the mixture of 75–85% by weight coal-tar pitch and 15–25% by weight coal-tar oil.

A curing agent for the epoxy resin should be added in an amount of 4–8% by volume so that the epoxy resin will harden sufficiently and not remain sticky. This ensures that after the foamed plastic spheres are coated with the binder, a friable mass of loose spheres is obtained. The preferred curing agents are aliphatic polyamines, e.g. triethylenetetramine.

The foamed plastic spheres are conveniently foamed polystrene having a particle size of 3 to 5 mm and a specific gravity of about 10–12 kg/m$^3$. However, the compressive strength of the blocks does not depend on the particular foamed plastic spheres employed.

For each 100 parts by volume of spheres, there are added 20–30 parts by volume of cement and 0.15–0.20 part by volume of binder. For each 356 parts by volume of coated spheres, there may be added about 10 parts by volume of sand. After pressing into the desired shape, the blocks take about 24 hours to harden.

The compressive strength of the blocks according to the invention is 0.35 N/mm$^2$. Blocks made in the same way but omitting the epoxy resin and curing agent from the binder have a compressive strength of 0.3 N/mm$^2$.

The method of preparing light-weight shaped concrete articles is illustrated in FIG. 1.

Spheres of a foamed plastic material produced in a way known per se are stored in a bin 1. At the bottom of the conical lower section 2 of this bin there is provided a narrow rectangular discharge portion below which a screw conveyor is accomodated within a cylindrical housing 3 which is in direct communication with said discharge opening. The screw conveyor is driven by an electric motor which itself or a transmission gear mechanism of which is variable in speed within a broad range from standstill and gradually increasing number of rotations in order to drive the screw at a variable accurately controllable speed. The screw conveyor opens in a suction line 4 of an exhaustor 5 having a blade wheel whose blades have rounded front edges so that the spheres may pass through the exhaustor without being damaged. The exhaustor 5 blows the spheres through the line 6 to a bin 7 which has a suitable vent, for instance in the upper wall, covered by a sieve plate having a fine mesh so that the air of the exhaustor can be discharged easily.

From the bin 7 the spheres drop into a first mixer 8, preferably consisting of a trough having two horizontal shafts 9 extending parallel to each other, each one of said shafts being provided with radially projecting pins 10, each pin being arranged in a staggered relationship with respect to the adjacent pins in the circumferential direction so that the free ends of said pins are disposed on a helix extending around the shaft. The mixer 8 has a length of, for instance, 4 meters while the pins on each one of the shafts are spaced apart over a distance of 10 cm. The pins of the two shafts are in overlapping position with respect to each other, i.e., that within the space between the two shafts a pin on the one shaft will slide past a pin on the other shaft while said shafts are rotating in opposite directions in such a manner that the pins will have a downward movement within the space between said shafts. During a large portion of the rotational movement, the terminal ends of the pins will move at close distance along the trough wall of the mixer. The pins make about three screw leads around the shaft. Such mixers are known per se. The shafts are rotated at a speed of about 200 rpm. At a distance of about 90 cm from the discharge opening of the bin 7, a feeder 11 opens into the mixer 8, through which feeder the binder consisting of the mixture of a non-phenol containing solution of coal-tar pitch in coal-tar oil and an epoxy resin to which is added a curing agent, is fed in an accurately metered quantity to the mixer 8, said quantity being adapted to the quantity of spheres supplied by the screw conveyor 3. Said mixture contains, e.g. 61.95% by volume of said solution, 30.97% by volume of the epoxy resin and 7.08% by volume of the curing agent. The mixing operation occurs over a portion of the path of the mixer 8, whereupon at 12 a portion of the totally required quantity of cement is fed into the mixer from a hopper 13 by means of a cell wheel. Immediately before the addition of cement the spheres strongly adhere to each other due to the presence of the binder. After the addition of cement and the admixing thereof with said spheres, there is again obtained at only a short distance from the feeding point of the cement, a friable mass consisting of loose spheres, which then have a specific gravity of 33 kg/m$^3$. Thus, spheres have been individually coated by the binder and then with a film of dry uncured cement. This film is of utmost importance as it is by this film that the spheres of foamed plastic in the final product are enabled to adhere to set cement over their entire surface so that a firm product is obtained consisting of spheres of foamed plastic material lying in a matrix of cement.

The coated spheres discharged from the mixer 8 are conveyed to a storage bunker 16 by means of the conveyor belt 15, from which bunker 16 metered quantities of spheres are delivered to the loading trough 19 of the mixer 20 by means of the conveyor belt 17 and through the funnel 18, whereafter said spheres are mixed with cement and water and any further additives in said mixer 20 and the obtained mixture is conveyed by means of the conveyor belt 21 to, e.g., an apparatus for pressing blocks 22.

In FIGS. 2 and 3 building blocks obtained by the method according to the invention are shown, at the left hand as viewed from on top and at the right hand as viewed from below. Building blocks shown in FIGS. 2 and 3 differ only in size, the block A shown in FIG. 2 being half the size of the block B shown in FIG. 3. At the top face of the blocks frustum-shaped protrusions 23 are formed which fit with a slight clearance into frustum-shaped recesses 24 formed in the bottom face of the blocks so that when the blocks are stacked upon each other to form a wall, said holes 25 form continuous passageways extending through the entire wall from its top surface to its bottom surface.

Preferably block B has a length of 60 cm, a width of 30 cm and a height of 20 cm, the weight of a block of this size being 11 kg.

In forming a wall, blocks due to their low weight are stacked by hand without applying any mortar between the blocks so that the blocks rest directly on each other with their top faces engaging the bottom faces of the adjacent blocks. As there are no horizontal joints formed by a mortar-layer between adjacent blocks as in the conventional walls formed from bricks or blocks, which joints permit the compensation of the varying heights of the bricks or blocks so that in each course of bricks or blocks their upper faces extend substantially in a horizontal plane, it is of importance that the blocks obtained by the invention be of uniform height. In forming the blocks by a pressing operation, it is virtually impossible to obtain such uniform height so that blocks are pressed in oversize for their height and thereafter are ground to the accurate height, which grinding operation is readily effected by the brittle composition of the blocks.

After a stacking operation to form the enclosing walls of a building, all passageways formed by the aligned holes 25 are filled with concrete to form concrete columns 26, some of which are shown in FIG. 4. In this way, the blocks, which due to their composition present a rather low compressive strength, have no supporting function as they each separately cling to the concrete columns so that all vertical extending forces are taken up by said columns whereas the blocks form distance members for said columns in which function they are capable of taking up relatively great horizontally extending forces.

In FIG. 5 is shown in more detail the lower portion of a wall of a building erected from blocks obtained by the invention. Firstly, a beam-like foundation 27 of concrete is formed which extends slightly above ground level 28. Then adjusting mortar layers 29 are formed on top of the foundation 27 and the blocks B are stacked on said layers and on top of each other until the final height of the wall is obtained (see FIG. 6) whereafter columns of concrete 26 are formed by pouring concrete into the aligned holes 25 of the blocks B.

A floor 30, e.g. composed of prefabricated elements having improved thermal insulating properties, is placed on the foundation 27, supporting means 31 of insulating material being interposed. On top of floor 30 a finishing layer 32 is provided. On the outer and inner surfaces of the blocks forming the wall, finising layers 33 and 34 are provided advantageously by a spraying process.

In FIG. 6 the top portion of the wall shown in FIG. 5 is depicted. On the uppermost blocks B' blocks B'' are positioned from which half is sawn off longitudinally. A mold 35 and reinforcing member 36 for forming a second floor 37 are placed on blocks B' and concrete is poured into the aligned holes 25 to form columns 26 and in mold 35 to form the second floor 37.

Then blocks B''' are stacked on blocks B'' and floor 37, an adjusting mortar layer 38 being provided. On floor 37 a finishing layer 39 is formed and the inner surfaces of blocks B''' are again coated by a finishing layer 34'.

In FIG. 7 the roof construction on top of blocks B''' is shown. From uppermost block B'''' the half is sawn off longitudinally and mold 40 with reinforcing members 41 is positioned. Then concrete is poured into aligned holes 25 of blocks B''' to form columns 26' and on mold 40 to form roof floor 42.

Anchor members 43 and 44 are fixed to roof floor 42, security anchors 45 being provided which are fixed in bores formed into the roof floor. Rafters 46 are supported by means of wall plate 47 and fixed by means of anchors 44. Further are shown tile laths 48 and roof tiles 49 plated by zinc.

Inner walls for the building can also be erected by stacking upon each other blocks of the same shape as blocks A or B. However, these blocks are preferably of the shape shown in FIGS. 8 and 9 and are pressed from a mixture of coated foamed plastic spheres and cement to which sand is added in order to improve the strength and the sound insulation at the cost of the thermal insulation of these blocks.

In FIGS. 8 and 9 building blocks C and D for erecting inner walls of a building are shown in the same way as the building blocks A and B are shown in FIGS. 2 and 3, the building block C being half the size of block D. Blocks C and D are provided with holes 51 having an octagonal cross-section. At the top surfaces of the blocks projecting ridges 52.52' are formed of which the inner surfaces form an extension of the largest opposing sides of the octagonal holes 51 and which ridges 52.52' fit into frustum-shaped recesses 53 formed into the bottom surfaces of the blocks. Further communication grooves 54 having a semi-circular cross-section are formed into the top surfaces of the blocks which open into holes 51 at the location of two opposing sides of the octagonal.

As shown in FIG. 10 for forming an inner wall blocks D are stacked upon each other in the same way as blocks B which form an outer wall. When the walls are erected to their desired height, the aligned holes 51 are filled with concrete so that concrete columns 55 are formed which have an octagonal cross-section and which are interconnected by bridges 56 of concrete formed by the concrete which also fills the grooves 54 covered by the flat bottom surfaces of the adjacent blocks on top. In this way the inner walls contain comparatively more concrete than the outer walls which improves the sound insulation of the inner walls.

The foamed plastic spheres coated by a film of the binder according to the invention and dry cement can be used as such for forming insulating finishing layers 32 and 39, in that these spheres are simply mixed with cement and water and this mixture is then spread over the respective floors.

I claim:

1. A method for manufacturing light-weight shaped concrete articles comprising the steps of blending a mass of loose substantially sphere-shaped particles of a foamed plastic material with a binder to form a sticky mass, then adding a first portion of dry cement and blending again until the mass consists mainly of loose spheres coated with a film of dry cement, and subjecting the cement coated spheres to a second mixing operation with a second portion of cement while metering in a quantity of water, and pressing the mixture thus obtained into the desired shape, wherein the binder consists of a mixture of a phenol-free solution of 75-85% by weight of coal-tar pitch having a ring and ball softening point of 50°-65° C. in 15-25% by weight of coal-tar oil having a distillation range of 150°-275° C. and 20-35% by weight of an epoxy resin.

2. The method according to claim 1, wherein a curing agent is added to said mixture before pressing.

3. The method according to claim 2, wherein said curing agent is triethylenetetramine.

4. The method according to claim 2, wherein said epoxy resin is a reaction product of epichlorohydrin and bisphenol A modified with a $C_{12}$-$C_{14}$ aliphatic glycidyl ether.

5. The method according to claim 1, wherein said plastic material is polystyrene.

6. The method according to claim 1, wherein for each 100 parts by volume of spheres there are added 20-30 parts by volume of dry cement and 0.15-0.20 part by volume of binder.

* * * * *